United States Patent
Van Der Poel

(10) Patent No.: US 9,565,834 B2
(45) Date of Patent: Feb. 14, 2017

(54) ANIMAL BRUSHING ARRANGEMENT AND METHOD OF OPERATING ANIMAL BRUSHING ARRANGEMENT

(71) Applicant: DELAVAL HOLDING AB, Tumba (SE)

(72) Inventor: Hans Van Der Poel, Roelofarendsveen (NL)

(73) Assignee: DeLaval Holding AB, Tumba (SE)

( * ) Notice: Subject to any disclaimer, the term of this patent is extended or adjusted under 35 U.S.C. 154(b) by 72 days.

(21) Appl. No.: 14/400,573

(22) PCT Filed: Mar. 13, 2013

(86) PCT No.: PCT/SE2013/050231
§ 371 (c)(1),
(2) Date: Nov. 12, 2014

(87) PCT Pub. No.: WO2013/176596
PCT Pub. Date: Nov. 28, 2013

(65) Prior Publication Data
US 2015/0136039 A1    May 21, 2015

Related U.S. Application Data

(60) Provisional application No. 61/650,527, filed on May 23, 2012.

(30) Foreign Application Priority Data

May 23, 2012 (SE) ...................................... 1250525

(51) Int. Cl.
*A01K 13/00* (2006.01)
*A46B 13/00* (2006.01)
*A46B 13/02* (2006.01)

(52) U.S. Cl.
CPC ............ *A01K 13/002* (2013.01); *A01K 13/004* (2013.01); *A46B 13/001* (2013.01); *A46B 13/02* (2013.01)

(58) Field of Classification Search
CPC .... A01K 13/004; A01K 13/002; A01K 13/00; A01K 13/003; A46B 13/00; A46B 13/001; A46B 13/02
(Continued)

(56) References Cited

U.S. PATENT DOCUMENTS 3,175,537 A    3/1965  Paul
3,814,934 A    6/1974  Mesh et al.
(Continued)

FOREIGN PATENT DOCUMENTS

CN    101938898    1/2011
CN    202179027    4/2012
(Continued)

OTHER PUBLICATIONS

CN Office Action, dated Nov. 12, 2015; Application No. 201380022497.0.
(Continued)

*Primary Examiner* — Patrick Hawn
(74) *Attorney, Agent, or Firm* — Young & Thompson

(57) ABSTRACT

An animal brushing arrangement and method wherein a support part, a brush, an electric motor and a rotation sensor are provided. The electric motor is arranged to rotate the brush about a rotation axis, and the rotation sensor is arranged to detect a rotational movement about the rotation axis that is caused by an external force applied to the brush, such as by an animal, when the motor is not operating, a detection of such a rotational movement being operative to activate the motor.

10 Claims, 3 Drawing Sheets

(58) Field of Classification Search
USPC .................................. 119/600, 601, 608, 609
See application file for complete search history.

(56) References Cited

U.S. PATENT DOCUMENTS

| | | | |
|---|---|---|---|
| 5,540,186 A | 7/1996 | Udelle | |
| 5,868,101 A * | 2/1999 | Marshall | A01K 39/014 119/428 |
| 5,970,911 A * | 10/1999 | van der Lely | A01J 5/0175 119/14.02 |
| 6,209,152 B1 * | 4/2001 | Kannenberg | A47K 7/046 4/606 |
| 6,318,298 B1 | 11/2001 | Nonay | |
| 6,655,319 B2 * | 12/2003 | Marshall | A01K 39/0113 119/428 |
| 7,481,184 B2 * | 1/2009 | van der Poel | A01K 13/004 119/621 |
| 8,156,895 B2 * | 4/2012 | Caputa | A01K 1/011 119/166 |
| 8,485,135 B2 * | 7/2013 | van der Poel | A01K 13/004 119/609 |
| 8,887,669 B2 * | 11/2014 | Friberg | A01K 13/004 119/609 |
| 2002/0195062 A1 * | 12/2002 | Marshall | A01K 39/0113 119/428 |
| 2003/0209209 A1 * | 11/2003 | Udelle | A01K 13/004 119/609 |
| 2004/0251656 A1 * | 12/2004 | Patterson | A61G 3/0209 280/304.1 |
| 2005/0029033 A1 * | 2/2005 | Rip | B62H 5/20 180/220 |
| 2005/0161003 A1 * | 7/2005 | van der Poel | A01K 13/004 119/608 |
| 2007/0000450 A1 * | 1/2007 | Otten | A01K 13/004 119/609 |
| 2007/0079998 A1 * | 4/2007 | Walter | B62B 1/20 180/19.1 |
| 2009/0114165 A1 * | 5/2009 | van der Poel | A01K 13/004 119/609 |
| 2011/0000438 A1 | 1/2011 | Van Der Poel | |
| 2011/0174234 A1 * | 7/2011 | Friberg | A01K 13/004 119/609 |
| 2012/0067288 A1 * | 3/2012 | Dole | A01J 7/04 119/14.18 |
| 2013/0125828 A1 * | 5/2013 | Van Der Poel | A01K 13/00 119/609 |
| 2014/0041597 A1 | 2/2014 | Van Der Poel | |
| 2015/0150217 A1 | 6/2015 | Van Der Poel | |

FOREIGN PATENT DOCUMENTS

| | | |
|---|---|---|
| DE | 91 03 341 U1 | 6/1991 |
| DE | 20 2007 009 018 U1 | 9/2007 |
| EP | 1 487 258 B1 | 6/2005 |
| EP | 1 665 927 A2 | 6/2006 |
| EP | 2 008 512 A1 | 12/2008 |
| EP | 2 359 684 A2 | 8/2011 |
| EP | 2 271 203 B1 | 11/2011 |
| EP | 2 422 617 A2 | 2/2012 |
| GB | 1271266 A | 4/1972 |
| RU | 37 591 U1 | 5/2004 |
| SU | 906467 A | 2/1982 |
| SU | 1625459 A1 | 2/1991 |
| WO | 2009/110828 A1 | 9/2009 |
| WO | 2009/131439 A1 | 10/2009 |
| WO | 2010/040631 A1 | 4/2010 |
| WO | 2010/107301 A1 | 9/2010 |
| WO | 2012/005654 A2 | 1/2012 |

OTHER PUBLICATIONS

International-Type Search Report, dated Nov. 15, 2012, from corresponding PCT application.
International Search Report, dated Jun. 24, 2013, from corresponding PCT application.
Supplementary International Search Report, dated Aug. 8, 2014, from corresponding PCT application.

* cited by examiner

ANIMAL BRUSHING ARRANGEMENT AND METHOD OF OPERATING ANIMAL BRUSHING ARRANGEMENT

TECHNICAL FIELD

The present invention relates to an animal brushing arrangement and a method of operating an animal brushing arrangement.

BACKGROUND

Some animal brushing arrangements for brushing larger animals such as livestock, horses, pigs, etc., are mounted to a support structure and provided with a rotating brush which is driven by an electric motor, either directly or via a gear box. The brush is provided with bristles which, when the brush is rotated, interact with the fur and skin of an animal. The animal is thus brushed, scratched and/or groomed by the rotating brush.

In a particular kind of such animal brushing arrangements the rotating brush is suspended at one end from a brush carrying arrangement. The brush carrying arrangement comprises one or more parts, which allow the brush to swing back and forth in at least one plane. The brush may thus be moved by an animal when leaning against the brush to reach different parts of the body of the animal. Such animal brushing arrangements may be provided with the electric motor attached to the brush carrying arrangement above the rotating brush, as disclosed in e.g. EP 1487258, EP 1665927 and WO 2012/005654. Alternatively, such an animal brushing arrangement may be provided with the electric motor arranged inside the brush, as disclosed e.g. in EP 2422617.

The electric motor of such a brushing arrangement is started and stopped in order to start and stop a rotation of the rotating brush. In particular, it is desirable to provide on-demand brushing when an animal is yearning to be brushed, e.g. by leaning against the brush. Thus, energy may be saved when no animal is present to be brushed. EP 2271203 and EP 2422617 disclose the use of sensors or switches for controlling brush rotation. EP 2271203 discloses a sensor arranged to detect, by means of markings on a wall mounted mounting plate, a direction of pivoting of a casing of the brush. The alternative use of an inclinometer or inclinodetector is also mentioned. A direction of rotation of the brush is based on the detection. EP 2422617 discloses a switch mounted on a portion of a carrier of the brush. The switch is actuated by an angle bar arranged on a further portion of the carrier, when the brush and the further portion perform a pivoting motion in relation to the switch.

It has been realized by the inventor that small animals such as calves and goats may not be strong enough to lift a brush sufficiently to trigger a switch arranged on parts of the carrying arrangement of a rotating brush.

SUMMARY

An object of the present invention is to provide an animal brushing arrangement comprising an alternative arrangement for triggering a start of rotation of a brush of the brushing arrangement, which triggering may be achieved also by animals too small to lift the brush.

According to an aspect of the invention, the object is achieved by an animal brushing arrangement for attaching to a support structure. The animal brushing arrangement comprises a support part arranged to be attached to the support structure, a brush, and an electric motor arranged to rotate the brush about a rotation axis. The brushing arrangement further comprises a rotation sensor arranged to interact with the brush. The brush is also rotatable by an externally applied force. The rotation sensor is adapted to sense a rotational movement caused by the externally applied force.

Since a rotation sensor is provided for sensing the rotational movement caused by the externally applied force, i.e. an externally induced rotation of the brush, an animal rotating the brush about its axis triggers the rotation sensor which may cause the electric motor to start rotating the brush. As a result, the above mentioned object is achieved. Even a small animal such as a calf or a goat may be able to apply the external force required to provoke the electric motor to rotate the brush.

The animal brushing arrangement may be attached to a supporting structure such as post or a wall. The animal brushing arrangement may be arranged in an animal housing, such as a barn or a stable. The animal brushing arrangement may be arranged in other locations, such as outdoors e.g. in a pasture. A control system may be provided for controlling the animal brushing arrangement. The control system may be adapted to control the electric motor as such, as well as peripheral functions such as: starting and stopping the electrical motor, monitoring electric motor current to prevent overload of the electric motor, provide a timer function, set direction of rotation of the electric motor, etc. The control system may comprise one single control unit or it may comprise two or more control units forming a distributed system. The rotation sensor may interact directly with the brush sensing the rotation of the brush about its rotation axis. Alternatively, the rotation sensor may interact indirectly with the brush. The brush may suitably be a substantially rotation symmetrical brush, having for instance a cylindrical, cigar, or hourglass shape. The brush may comprise an inner portion and bristles, the bristles being attached to the inner portion.

According to embodiments, the rotation sensor may comprise a pulse generator arranged to generate electrical pulses when the brush is rotated. In this manner the electrical pulses may be utilized by a control system of the brushing arrangement to start the electric motor and thus a rotation of the brush about its rotation axis.

According to embodiments, the electric motor may comprise the pulse generator. This may form a convenient and straight forward manner of indirect sensing the rotation of the brush. Some types of electrical motors are provided with a sensor arrangement for controlling the rotation of the electric motor. Such a sensor arrangement may comprise or form a pulse generator. Such a sensor arrangement is connected to a motor controller which utilizes the generated pulses from the sensor arrangement for controlling the rotation of the electric motor. It has been realized by the inventor that a sensor arrangement of the electric motor, the sensor arrangement comprising a pulse generator, may be utilized for triggering the electric motor to rotate the brush. Pulses are generated by the pulse generator of the sensor arrangement when the electric motor is rotated by means of control signals from the motor controller as well as when the electric motor is rotated by and external momentum applied to a drive shaft of the electric motor. In the latter case the momentum is applied by the externally induced rotation of the brush, i.e. a rotation of the brush caused by the externally applied force.

According to embodiments, the animal brushing arrangement may comprise a control system, wherein the pulse generator is connected to the control system, and wherein the control system may be adapted to start the electric motor in response to a predetermined number of electrical pulses from the pulse generator being received by the control system. Due to the requirement for a predetermined number of electrical pulses, accidental starting of the rotating of the brush may be avoided, i.e. rotation not caused by an animal such as rotation caused by air movement will not start the electric motor. As discussed above, the control system for controlling the animal brushing arrangement may be adapted to control the electric motor as such, as well as peripheral functions. The control system may comprise one single control unit or it may comprise two or more control units forming a distributed control system.

According to embodiments, the predetermined number of electrical pulses corresponds to a rotational movement of the brush about its rotation axis of at least 1 degree.

According to embodiments, the electric motor may be a brushless motor and the rotation sensor may be a sensor arrangement adapted for controlling the brushless motor.

According to embodiments, the electric motor may be adapted for an operating voltage of 24 Volts. In this manner a voltage provided from the control system to the electric motor may not exceed 24 Volts. A low voltage system is thus provided, which does not require the same precautions as a higher voltage system does.

According to embodiments, a transmission may be arranged between an output shaft of the electric motor and the brush.

According to embodiments, the rotation sensor may comprise a Hall Effect sensor. The Hall Effect sensor may generate electrical pulses or an oscillating electrical signal. The oscillating electrical signal is herein considered to comprise electrical pulses. The oscillating electrical signal may be interpreted as electrical pulses by a control system of the animal brushing arrangement.

According to embodiments, the rotation sensor may comprise a photo sensor. The photo sensor may generate electrical pulses.

According to embodiments, the support part may comprise a support arm and the animal brushing arrangement may comprise a hinge arrangement attached to the support arm.

In this manner the brush may be suspended from the hinge arrangement such that the brush may be pivoted in a substantially vertical plane about an axis of the hinge arrangement.

According to embodiments, the animal brushing arrangement may comprise a brush frame attached to the hinge arrangement. The electric motor may be attached to the brush frame inside the brush. The brush may be arranged to rotate about the brush frame and the electric motor. In this manner the electric motor may be protectively arranged inside the brush. A transfer of the rotation of the electric motor to the brush, and vice versa, may easily be achieved.

According to a further aspect of the invention, the above-mentioned object is achieved by a method of operating an animal brushing arrangement. The animal brushing arrangement comprising a support part arranged to be attached to a support structure, a brush having a rotation axis, an electric motor, and a rotation sensor arranged to interact with the brush. The method comprises, in the following order:
causing a rotational movement of the brush about its rotation axis by an externally applied force,
sensing with the rotation sensor the rotational movement, and
using the electric motor to rotate the brush about its rotation axis.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout. Well-known functions or constructions will not necessarily be described in detail for brevity and/or clarity.

Figure 1:
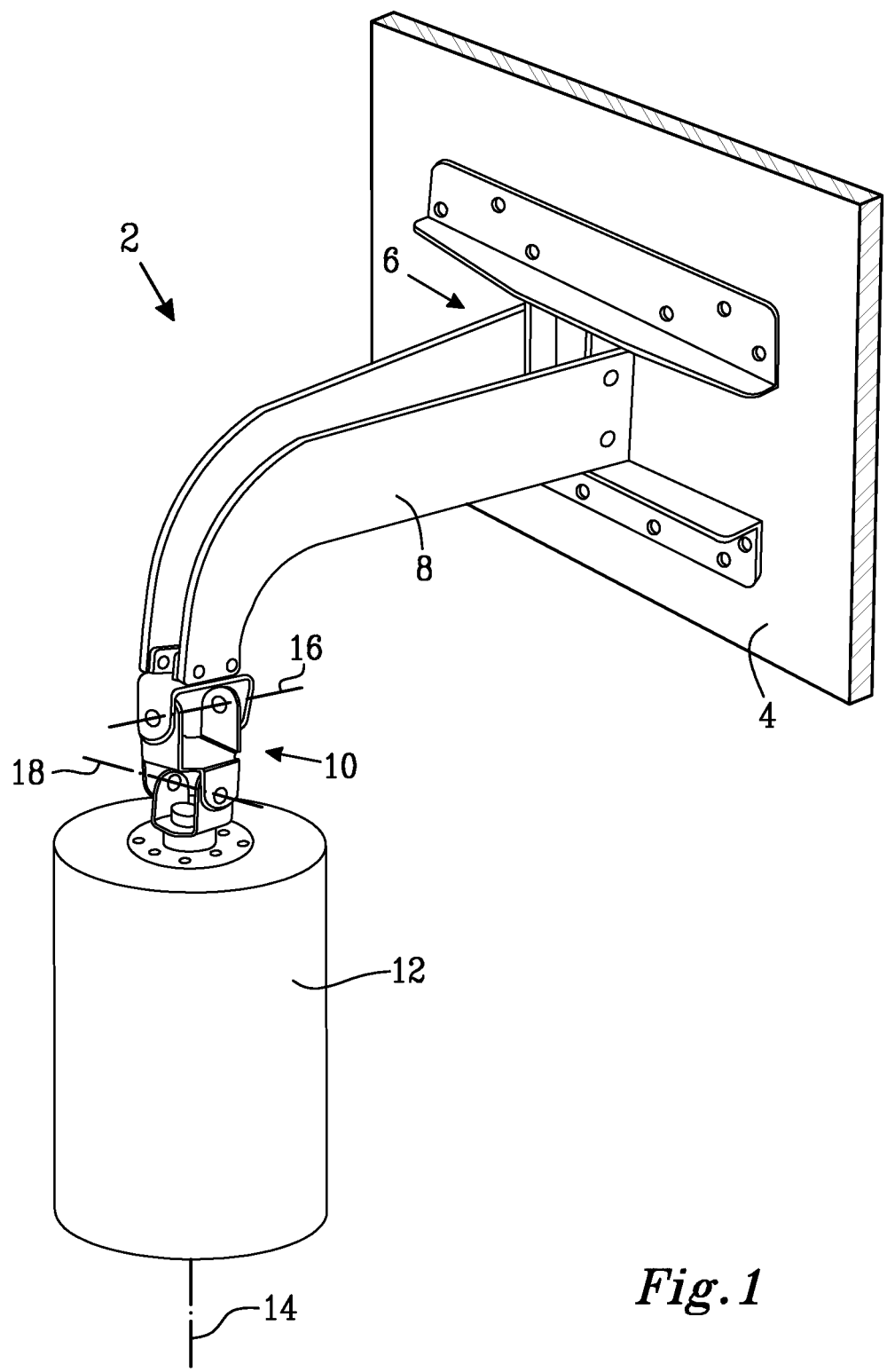
FIG. 1 illustrates an animal brushing arrangement according to embodiments for attaching to a support structure.

FIG. 1 illustrates an animal brushing arrangement 2 according to embodiments for attaching to a support structure, such as a wall 4. The animal brushing arrangement 2 comprises a support part 6 arranged to be attached to the support structure 4. The support part 6 comprises a support arm 8. A hinge arrangement is 10 attached to the support arm 8 and a brush 12 is suspended from the hinge arrangement 10. Purely as an example it may be mentioned that the brush 12 may have a cylindrical shape with a diameter of approximately 260 mm and a height of approximately 370 mm. The brush 12 may naturally have a different shape and different size. An electric motor is arranged inside the brush to rotate the brush 12 about a rotation axis 14. The hinge arrangement 10 comprises two substantially orthogonal axes 16, 18. The brush 12 may thus be pivoted within in a space substantially forming a half sphere. Alternatively, the hinge arrangement 10 may comprise only one axis, in which case the brush 12 may be pivoted in a vertical plane. Purely mentioned as an example, the support arm 8 may extend approximately 600 mm outwardly from the support structure.

The brush 12 is adapted to be rotated about its rotation axis 14 by an externally applied force. An animal desiring to be brushed by the brushing arrangement 2 may lean against the brush 12, thus subjecting the brush 12 to an externally applied force which causes the brush 12 to rotate about its rotation axis 14. A rotation sensor is arranged to interact with the brush 12. The rotation sensor is adapted to sense a rotational movement induced by the externally applied force. A control system is provided for controlling the animal brushing arrangement 2. A rotational movement sensed by the rotation sensor prompts the control system to start the electrical motor to rotate the brush 12 about its rotation axis 14. Purely mentioned as an example, the rotation speed of the brush 12 may be about 50 rpm, which may entail a peripheral speed of the brush of about 42 meters/minute.

Figure 2:
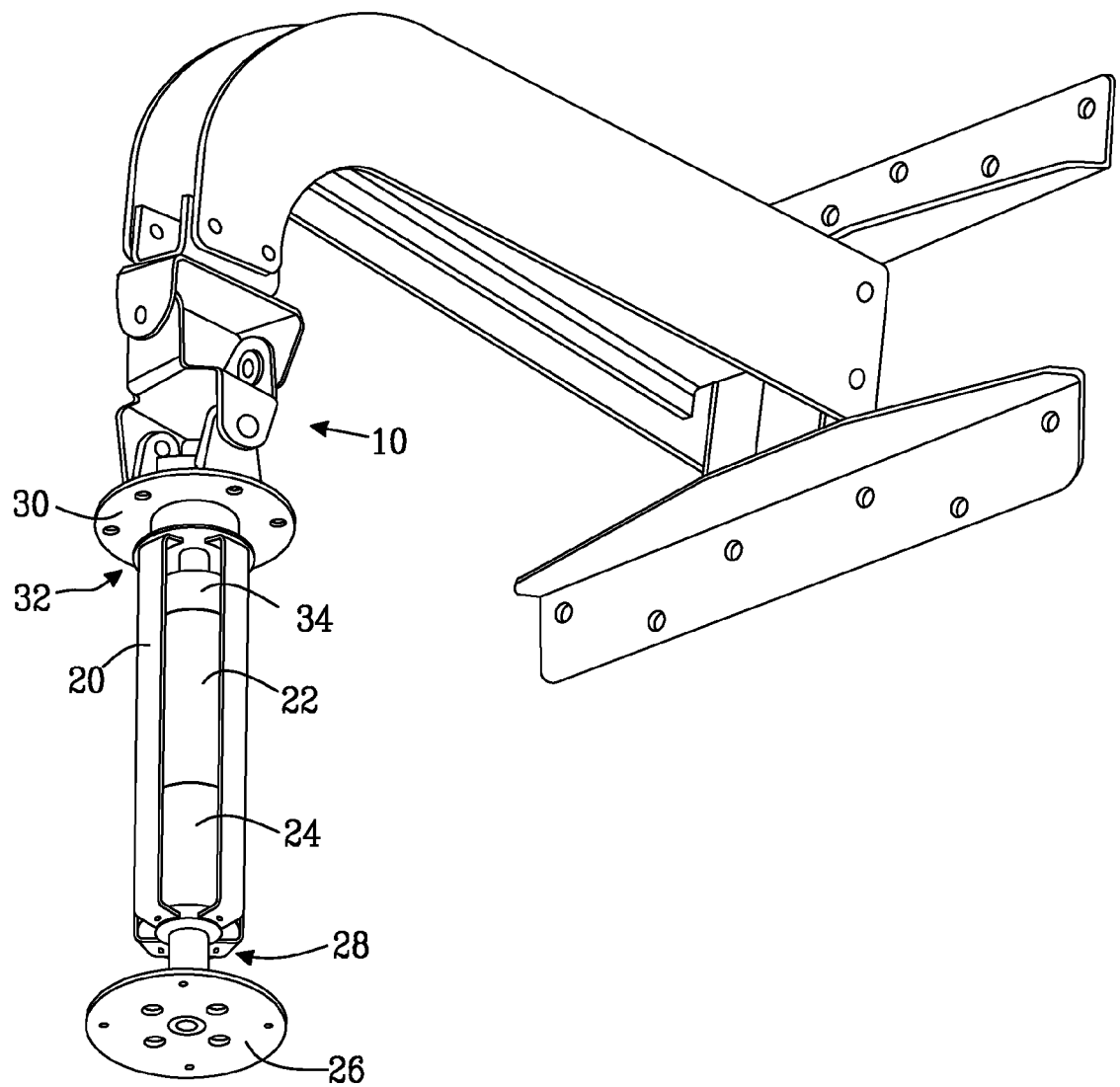
FIG. 2 illustrates the animal brushing arrangement of FIG. 1 with the brush removed.

FIG. 2 illustrates the animal brushing arrangement 2 of FIG. 1 with the brush 12 removed. A brush frame 20 is attached to the hinge arrangement 10. As mentioned above, an electric motor 22 is arranged inside the brush. The electric motor 22 is attached to the brush frame 20. The brush is arranged to rotate about the brush frame 20 and the electric motor 22. Accordingly, the brush frame 20 is not actively rotated in relation to the hinge arrangement 10.

The brush frame 20 extends about the rotation axis 14 of the brush. The brush frame 20 is elongated and extends along the rotation axis 14. A transmission 24 is arranged between an output shaft of the electric motor 22 and the brush. The transmission may comprise a planetary gearing, e.g. as provided by the company IMS Gear. The transmission may have a transmission ratio of between 20:1 and 35:1.

The brush is supported by a first support member 26 arranged at a first end 28 of the brush frame 20 and by a second support member 30 at a second end 32 of the brush frame 20. The brush is attached to an output shaft of the transmission 24 at the first end 28 of the brush frame 20 by means of the first support member 26. The second support member 30 is rotatably supported by at least one bearing arranged between the second support member 30 and the brush frame 20. The weight of the brush is thus substantially supported by the brush frame 20 and the hinge arrangement 10, and not by the output shaft of the transmission 24.

The electric motor 22 comprises a sensor arrangement 34. The sensor arrangement 34 is utilized for controlling the electric motor. Furthermore, the sensor arrangement 34 forms the rotation sensor arranged to interact with the brush, which rotation sensor is adapted to sense a rotational movement induced by an externally applied force to the brush.

Figure 3:
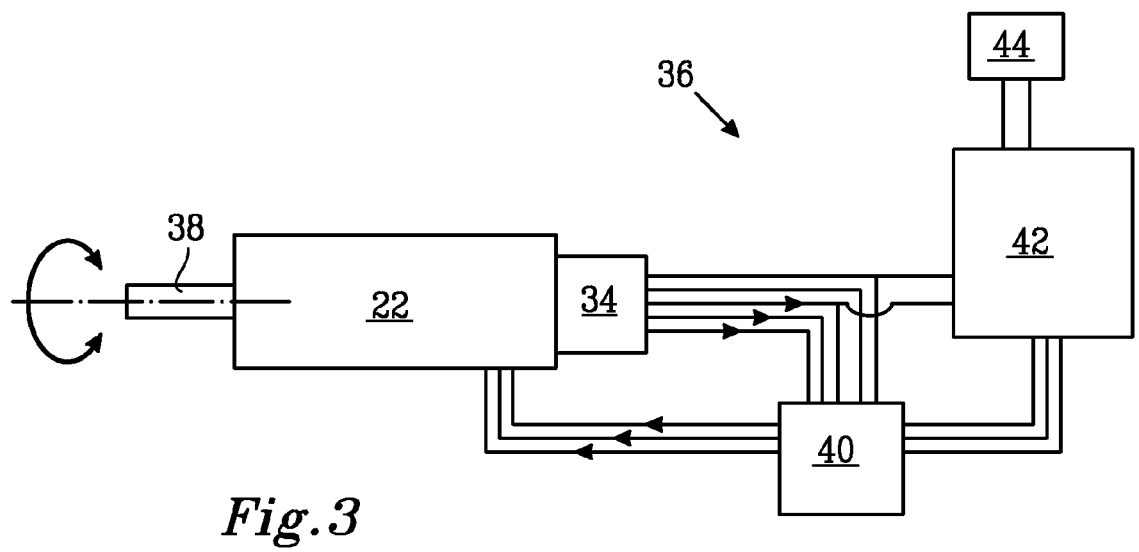
FIG. 3 illustrates an electric motor and a control system for an animal brushing arrangement.

FIG. 3 illustrates an electric motor 22 and a control system 36 for an animal brushing arrangement according to embodiments, such as the animal brushing arrangement 2 described in connection with FIGS. 1 and 2. The electric motor 22 is arranged to rotate a brush of the animal brushing arrangement.

The electric motor 22 comprises an output shaft 38 and a sensor arrangement 34. The control system 36 comprises a motor controller 40, a control device 42, and a timer 44.

The motor controller 40 is arranged to control the electric motor 22 on a basic level. From the sensor arrangement 34 signals relating to the rotation of the electric motor 22 are sent to the motor controller 40, which signals are utilized by the motor controller 40 to power the electric motor 22. The timer 44 counts down a specific period of time, e.g. 1 minute.

The control device 42 is set to control the operation of the brushing arrangement 2. Signals from the sensor arrangement 34 are also received by the control device 42. Accordingly, when the brush is rotated by an animal the rotation is transferred to electric motor 22, and the sensor arrangement 34 sends out a signal in the form of electrical pulses. Thus, the sensor arrangement 34 forms a rotation sensor of the animal brushing arrangement. The control device 42 receives the signal from the sensor arrangement 34 and sends a start signal to the motor controller 40. At the same time the control device 42 starts the timer 44. The motor controller 40 controls the rotation of the electric motor 22 as set out above until a stop signal is received from the control device 42. The control device 42 is alerted by the timer 44 when it has been counted down. Then the control device 42 sends the stop signal to the motor controller 40. If the animal desires to be further brushed, the animal starts another period of brushing in the same manner as described above. If no animal is present, the brush remains stopped until the brush is again rotated by an animal.

The sensor arrangement 34 may comprise at least one Hall Effect sensor. Alternatively, the rotation sensor may comprise a photo sensor. The photo sensor may generate electrical pulses correlating with a rotation of the electric motor 22. In both cases a rotation sensor in the form of a pulse generator is provided, i.e. the electric motor 22 comprises the pulse generator. Electrical pulses are generated when the brush is rotated.

The electric motor 22 may be a brushless motor adapted for an operating voltage of 24 Volts, such as the MB057GA412 by the company Exmek. The motor controller 40 may be a brushless motor controller, such as the EM-206 brushless motor controller with Hall Effect sensor input by the company Electromen Oy, Finland.

The control system 36 may be adapted to start the electric motor 22 in response to a predetermined number of electrical pulses from the sensor arrangement 34. The predetermined number of electrical pulses may correspond to a rotational movement of the brush about its rotation axis of at least 1 degree. Accidental starting of the electrical motor 24 and the rotation of the brush may thus be avoided. Suitably, it should be ensured when stopping the electric motor 22 that the electric motor 22 stops within the rotational movement of the brush corresponding to the predetermined number of electrical pulses. Thus, accidental starting of the electric motor 22 caused by the retardation rotation of the brush from a previous brushing operation may be avoided. Upon receiving a stop signal from the control device 42, the motor controller 40 may actively stop the electric motor 22, i.e. not only shut down power to the electric motor 22 but instead control power to the electric motor 22 to promote a retardation of the rotation of the electric motor 22.

The control device 42 may provide a rotation direction signal to the motor controller 40. In response to the rotation direction signal the motor controller 40 rotates the electric motor 22 either in a clockwise or a counter clockwise direction. The control device 42 may e.g. be set to alternate the rotation direction of the electric motor 22 each time the electric motor is started, or to rotate the electric motor 2 in a direction corresponding to the direction of rotation to which an animal subjects the brush.

Figure 4:
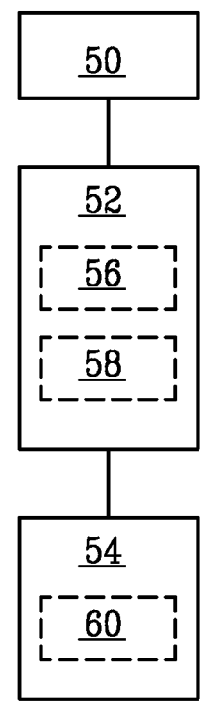
FIG. 4 illustrates a method of operating an animal brushing arrangement.

FIG. 4 illustrates a method of operating an animal brushing arrangement. The animal brushing arrangement comprises a support part arranged to be attached to a support structure, a brush having a rotation axis, an electric motor, and a rotation sensor arranged to interact with the brush. The animal brushing arrangement may be an animal brushing arrangement 2 as described in connection with FIGS. 1 and 2, and may comprise a control system 36 as described in connection with FIG. 3.

The method comprises, in the following order:
causing 50 a rotational movement of the brush about its rotation axis by an externally applied force,
sensing 52 with the rotation sensor the rotational movement, and
using 54 the electric motor to rotate the brush about its rotation axis.

According to embodiments the sensing 52 may comprise: generating 56 electrical pulses.

According to embodiments, the sensing 52 may comprise: receiving 58 electrical pulses from the pulse generator by the control system, and the using 54 may comprise: starting 60 the electric motor in response to a predetermined number of electrical pulses being received by the control system.

According to embodiments, the predetermined number of electrical pulses may correspond to a rotational movement of the brush about its rotation axis of at least 1 degree.

Example embodiments described above may be combined as understood by a person skilled in the art. It is also understood by those skilled in the art that the rotation sensor may directly interact with the brush, e.g. a wheel of the rotation sensor may abut against a portion of the brush and may be rotated by the brush as the brush is rotated by an externally applied force.

Although the invention has been described with reference to example embodiments, many different alterations, modifications and the like will become apparent for those skilled in the art. For instance the control system 36 described in connection with FIG. 3 may comprise one single control unit performing the above-mentioned control of the animal brushing arrangement and the electric motor 22. As a further alternative, the control system 36 may comprise a different number of components than the three components described in connection with FIG. 3.

Therefore, it is to be understood that the foregoing is illustrative of various example embodiments and the invention is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. An animal brushing arrangement that attaches to a support structure, the animal brushing arrangement comprising:
    a support part arranged to be attached to the support structure;
    a brush suspended from the support part;
    an electric motor that operatively rotates the brush about a rotation axis; and
    a rotation sensor arranged to interact with the brush,
    wherein the brush, when not under operative influence of the motor, is free to rotate about the rotation axis by way of an external force upon said brush other than a force of said electric motor,
    wherein the rotation sensor is adapted to sense a rotational movement of the brush about the rotation axis caused by the external force,
    wherein the rotation sensor comprises a pulse generator arranged to generate electrical pulses when the brush is rotated about the rotation axis,
    wherein said pulse generator is connected to a control system, the control system being adapted to start the electric motor in response to receiving a predetermined number of electrical pulses from the pulse generator, and
    wherein the predetermined number of electrical pulses corresponds to a rotational movement of the brush about the rotation axis of at least 1 degree.

2. The animal brushing arrangement according to claim 1, wherein the pulse generator is integral with said electric motor.

3. The animal brushing arrangement according to claim 1, wherein the electric motor is a brushless motor and the rotation sensor is a sensor arrangement adapted for controlling the brushless motor.

4. The animal brushing arrangement according to claim 1, wherein the electric motor is adapted for an operating voltage of 24 Volts.

5. The animal brushing arrangement according to claim 1, wherein a transmission is arranged between an output shaft of the electric motor and the brush.

6. The animal brushing arrangement according to claim 1, wherein the rotation sensor comprises a hall effect sensor.

7. The animal brushing arrangement according to claim 1, wherein the rotation sensor comprises a photo sensor.

8. The animal brushing arrangement according to claim 1, wherein the support part comprises a support arm and the animal brushing arrangement comprises a hinge arrangement attached to the support arm.

9. The animal brushing arrangement according to claim 8, further comprising:
    a brush frame attached to the hinge arrangement,
    wherein the electric motor is attached to the brush frame inside the brush, and wherein the brush is arranged to rotate about the brush frame and the electric motor.

10. A method of operating an animal brushing arrangement provided with a support part arranged to be attached to a support structure, a brush having a rotation axis, an electric motor, and a rotation sensor, the rotation sensor comprising a pulse generator, arranged to interact with the brush, the method comprising the sequential steps of:
    causing a rotational movement of the brush about the rotation axis when the motor is not activated for rotating the brush, the rotational movement being actuated by application of an external force from a source other than said electric motor;
    sensing, at the rotation sensor, the rotational movement of the brush about the rotation axis, the sensing comprising generating electrical pulses as a result of the rotational movement;
    upon the rotation sensor sensing the rotational movement, activating the electric motor to cause the brush to rotate about the rotation axis,
    wherein the animal brushing arrangement comprises a control system connected to the pulse generator,
    wherein the sensing further comprises:
        receiving electrical pulses from the pulse generator by the control system, and
    wherein the electric motor is activated in response to a predetermined number of electrical pulses being received by the control system, and
    wherein the predetermined number of electrical pulses corresponds to a rotational movement of the brush about the rotation axis of at least 1 degree.

* * * * *